United States Patent [19]

Pauls

[11] 3,727,772
[45] Apr. 17, 1973

[54] APPARATUS FOR CENTERING AND CLAMPING ELONGATED WORKPIECES

[75] Inventor: Kurt Pauls, Langenfeld, Germany

[73] Assignee: Th. Kieserling & Albrecht, Solingen, Germany

[22] Filed: Nov. 29, 1971

[21] Appl. No.: 202,812

[30] Foreign Application Priority Data

Dec. 31, 1970 Germany..................P 20 64 664.4

[52] U.S. Cl. ...................................214/1 P, 269/25
[51] Int. Cl. ................................................B23q 3/08
[58] Field of Search............................269/20, 25–27, 269/29–35, 152–153, 216–218; 214/1 P

[56] References Cited

UNITED STATES PATENTS

| 2,875,718 | 3/1959 | Bieri et al.................................269/25 |
| 3,580,459 | 5/1971 | Gage et al..............................269/34 |
| 3,667,620 | 6/1972 | Steiro....................................214/1 P |

Primary Examiner—Harold D. Whitehead
Assistant Examiner—Robert C. Watson
Attorney—Michael S. Striker

[57] ABSTRACT

Apparatus for centering and clamping tubes, rods or like workpieces has two double-acting cylinders which are reciprocable along parallel feed screws rotatably mounted in the frame of the apparatus. The feed screws have oppositely inclined mirror symmetrical threads meshing with internal threads provided on nuts which are adjustably fastened to the cylinders. The cylinders support mirror symmetrical work-engaging claws and receive pistons which are connected to each other by a piston rod extending midway between and being parallel with the feed screws. When the chambers of the cylinders receive a pressurized fluid so that the cylinders and their claws move toward or away from each other, the feed screws rotate and insure that the cylinders move at the same rate.

10 Claims, 4 Drawing Figures

INVENTOR
KURT PAULS

INVENTOR
KURT PAULS

APPARATUS FOR CENTERING AND CLAMPING ELONGATED WORKPIECES

BACKGROUND OF THE INVENTION

The present invention relates to apparatus for centering and clamping or similarly holding elongated workpieces, for example, metallic tubes or rods. Such apparatus are used in many types of machine tools wherein elongated workpieces are treated while dwelling in accurately determined positions and/or wherein the workpieces are caused to move lengthwise during treatment whereby the axis of at least a certain portion of each workpiece must coincide with a predetermined axis.

In a presently known centering apparatus for tubes or rods which is described in U.S. Pat. No. 2,966,721, one of two work-engaging jaws is mounted directly on the piston rod of a piston which is reciprocable in a cylinder. The other jaw which is mirror symmetrical to the one jaw is provided with an outwardly extending toothed rack which is reciprocably guided in the frame of the centering apparatus and meshes with the upper portion of a pinion which is rotatable in the frame. The lower portion of the pinion meshes with a second toothed rack which is reciprocably mounted in the frame and is connected with the piston rod in the region of the one jaw. The racks serve to synchronize the movements of jaws toward or away from each other as well as to apply the necessary clamping force when the jaws engage a workpiece which is placed therebetween. The application of a force which is needed to insure a satisfactory clamping action results in considerable wear upon the teeth of racks and pinion so that the synchronizing action of such parts is unreliable after a relatively short period of use. Furthermore, if the apparatus is to furnish a substantial clamping force, it must employ strong and bulky racks so that the apparatus occupies a considerable amount of space which is undesirable in many types of machine tools or the like.

U.S. Pat. No. 2,655,066 discloses a modified clamping and centering apparatus wherein the workpiece is engaged by driven rollers because the apparatus is used in a machine for the shaving of metallic tubes or rods. The rollers are rotatably mounted on discrete arms which are pivotable in the frame of the centering apparatus by means of hydraulic cylinders which are fixedly mounted in the frame and whose pistons are coupled to the respective arms. The synchronizing mechanism comprises levers which are connected with the shafts of pair-wise arranged rollers and have followers slidable in the slot of a fixedly mounted guide. A drawback of such apparatus is that the workpieces cannot be introduced from above (which is desirable or necessary in many types of machines for the treatment of metallic rods or tubes wherein the workpieces are delivered between the work-engaging elements by a transfer mechanism which moves the workpieces sideways), and also that the synchronizing mechanism must take up at least some of the stresses which arise when the rollers engage a workpiece. This causes considerable wear and reduces the accuracy of the synchronizing action.

SUMMARY OF THE INVENTION

An object of the invention is to provide a relatively simple, compact and rugged centering and clamping apparatus for elongated workpieces, such as metallic tubes, bars or rods, wherein the movements of claws or otherwise configurated work-engaging elements relative to each other are synchronized with a high degree of accuracy and wherein the synchronizing action does not change in response to prolonged use of the apparatus.

Another object of the invention is to provide an apparatus wherein the mechanism which synchronizes the movements of work-engaging elements relative to each other need not apply or withstand those forces which are necessary to insure proper engagement between such elements and a workpiece.

A further object of the invention is to provide an apparatus wherein all parts are readily accessible, which allows for the introduction of workpieces between the work-engaging elements from above, and wherein all sensitive parts are properly protected from dust, scale and/or other foreign matter.

An additional object of the invention is to provide novel and improved synchronizing means for the work-engaging elements of an apparatus for centering and clamping of light-weight, medium-weight or heavy elongated workpieces.

Still another object of the invention is to provide an apparatus which can be used as a superior and long-lasting substitute for presently known centering and clamping apparatus for elongated workpieces.

The improved apparatus comprises a frame of an analogous support, at least one but preferably two parallel transversely aligned feed screws whose outer portions are rotatably mounted in bearings provided therefor in the support and whose inner portions are provided with oppositely inclined mirror symmetrical external threads meshing with internal threads of nuts which are mounted on two cylinders reciprocable along the feed screws toward or away from each other whereby the feed screws rotate and insure accurate synchronization of movements of work-engaging claws or analogous elements mounted on the cylinders, and means for moving the cylinders relative to each other to thereby rotate the feed screws. Such means for moving the cylinders preferably comprises pistons which are reciprocable in the cylinders and are connected to each other by a piston rod extending in parallelism with the located midway between the feed screws, and a preferably hydraulic circuit which effects controlled admission of a pressurized fluid into and the evacuation of fluid from the chambers of the cylinders. The cylinders are preferably of the double-acting type and the work-engaging elements are preferably mounted on top of the respective cylinders so that the workpieces can be fed from above by one or more conventional or specially designed transfer mechanisms which transport the workpieces sideways and introduce them into the space between the elements while the two cylinders are held at a desired distance from each other.

The feed screws and the nuts need not take up any appreciable stresses which arise when the elements engage and clamp a workpiece; therefore, their synchronizing action remains intact even after prolonged use of the apparatus.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 2:
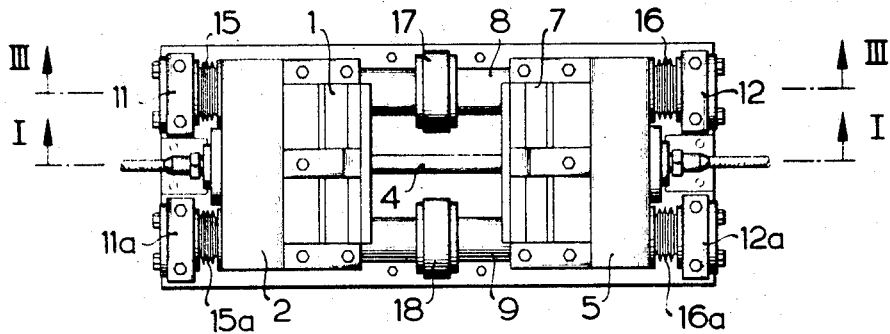
FIG. 2 is a plan view of the structure shown in FIG. 1, with the frame omitted.

The drawing illustrates an apparatus which comprises a frame 50 including a horizontal top wall 51 which carries a base plate or support 10. The latter indirectly supports two holders 2, 5 for work-engaging elements in the form of jaws or claws 1 and 7. In accordance with a feature of the invention, the holders 2 and 5 constitute double-acting hydraulic cylinders which respectively receive pistons 3 and 6 connected to each other by a piston rod 4. The holders or cylinders 2, 5 are supported and guided by two horizontal feed screws 8 and 9 which are parallel with and flank the piston rod 4. The feed screws 8, 9 are of identical size and shape and are mirror symmetrical with reference to a vertical plane which includes the axis of the piston rod 4. Since the mounting of the two feed screws is identical, FIG. 3 merely shows the manner in which the feed screw 8 can be rotated in order to insure simultaneous movements of the work-engaging claws 1 and 7 toward or away from each other. The two outer end portion 8a and 8b of the feed screw 8 are rotatably mounted in antifriction bearings 52, 53 which are installed in upwardly extending bearing brackets 11, 12 of the base plate 10. The arrangement is such that the outer end portions 8a, 8b can rotate in but cannot move axially of the bearings 52 and 53. Similar antifriction bearings are provided in the bearing brackets 11a, 12a (FIG. 2) for the end portions of the feed screw 9. The bearing brackets 11, 11a, 12, 12a are preferably welded to the base plate 10. The feed screw 8 further comprises two intermediate or inner portions 8c and 8d which are respectively provided with right-hand and left-hand threads meshing with nuts 2a, 5a which are fixedly but adjustably mounted in the cylinders 2 and 5. Each of the threads may include a substantial number (for example, eight) helices and the lead of these threads is preferably such that the feed screw 8 can rotate in response to movement of the claws 1, 7 toward or away from each other without any likelihood self-locking action.

The nuts 2a, 5a are fixedly secured to the respective cylinders 2 and 5 by screws 13 or analogous removable fasteners. The stems of such fasteners extend through equidistant arcuate slots (not specifically shown) provided in the flanges of the nuts 2a, 5a so that, upon loosening of the fasteners 13, the angular positions of the nuts 2a, 5a with reference to the cylinders 2, 5 can be changed within a desired range. Such adjustability of the nuts 2a, 5a with reference to the cylinders 2, 5 enables an operator to move the claws 1 and 7 to positions at an identical distance from the ideal axis 14 of an elongated workpiece 55 which is placed between and is to be clamped by the claws 1 and 7 in response to admission of a pressurized fluid into the inner chambers of the cylinders. The cylinders 2 and 5 respectively comprise sleeves 2b and 5b which are inwardly adjacent to the respective nuts 2a, 5a and are slidable with minimal clearance on the feed screw 8. Similar sleeves are provided in the cylinders 2 and 5 for the second feed screw 9. Each of the sleeves 2b and 5b can be press-fitted into the respective cylinder. Bellows 15 and 16 are respectively connected between the brackets 11, 12 and nuts 2a, 5a to protect the corresponding portions of the feed screw 8 against scales dust and/or other foreign matter. Similar bellows 15a, 16a surround portions of the feed screw 9 (see FIG. 2). The main function of such bellows is to prevent a contamination of the right-hand and left-hand threads on the two feed screws.

In order to reduce the likelihood of undue flexing of the feed screws 8 and 9, especially when the claws 1 and 7 are to engage and support a relatively heavy tubular or solid rod-shaped workpiece, the median portions of the feed screws are respectively rotatable in antifriction bearings 56 provided in two bearing brackets 17, 18 mounted on or integral with the base plate 10 between the cylinders 2 and 5.

Figure 4:
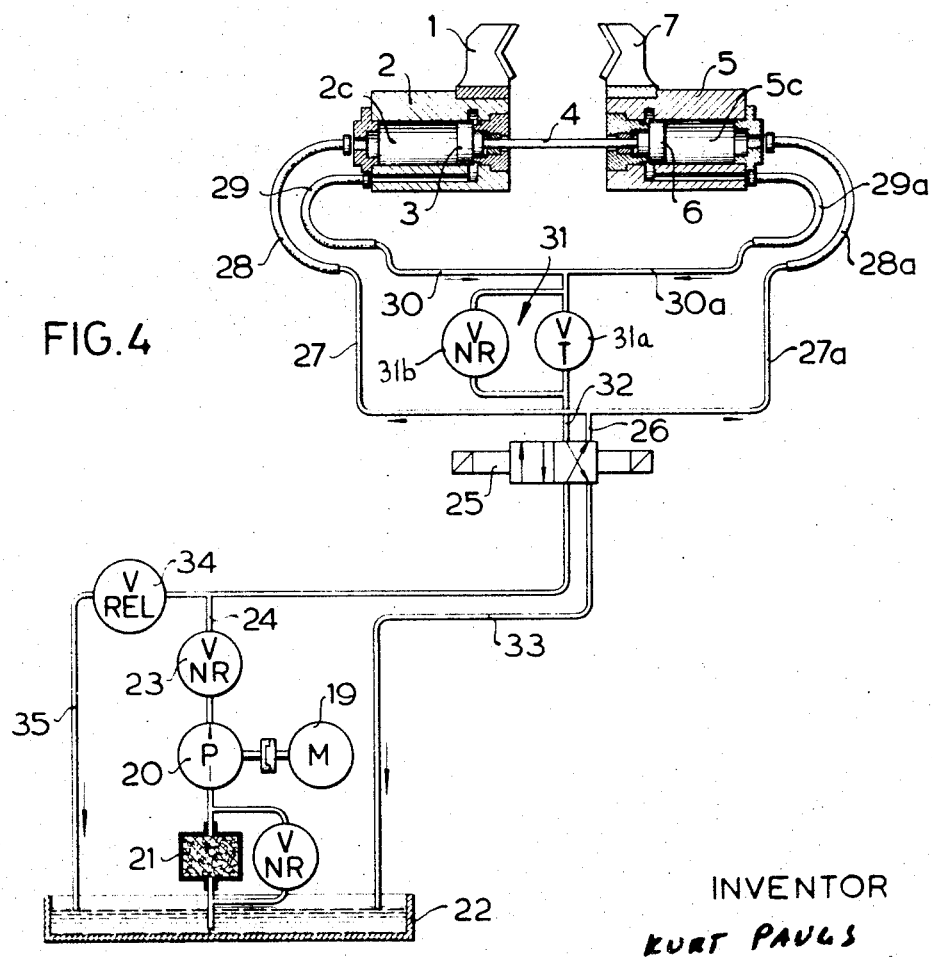
FIG. 4 is a diagram of the hydraulic circuit of the apparatus.

FIG. 4 illustrates certain details of the hydraulic circuit of the cylinders 2 and 5. A tank 22 or an analogous source contains a supply of hydraulic fluid (e.g., oil) which can be drawn by a pump 20 by way of an oil filter 21 when the pump 20 is driven by an electric motor 19. The pressure side of the pump 20 delivers pressurized fluid into a conduit 24 which contains a check valve 23 and is connected with a return conduit 35 containing an adjustable pressure relief valve 34. The conduit 24 is further connected with an electromagnetically operated valve 25 which can connect the conduit 24 with a conduit 26 or with a conduit 32 while simultaneously connecting the conduit 32 or 26 with a return conduit 33. The conduit 26 branches into two conduits 27, 27a which are connected with the outer chambers 2c, 5c of the cylinders 2, 5 by flexible hoses 28, 28a. The conduit 32 branches into conduits 30, 30a which are connected with the inner chambers of the cylinders 2, 5 by way of flexible hoses 29, 29a. The conduit 32 contains a flow regulating unit 31 including a flow restrictor 31a in parallel with a check valve 31b.

The operation:

Prior to clamping a workpiece 55, the claws 1 and 7 are moved apart to the positions shown in FIGS. 1 to 4. Such movements of the claws 1 and 7 are brought about in response to starting of the motor 19 which drives the pump 20 so that the latter supplies pressurized fluid through the valve 23 in conduit 24, valve 25, conduit 26, its branches 27, 27a, hoses 28, 28a and into the outer chambers 2c, 5c of the cylinders 2 and 5.

Thus, the cylinders 2 and 5 are caused to move away from each other to the extent determined by the pistons 3 and 6. The inner chambers of the cylinders 2 and 5 discharge fluid by way of hoses 29, 29a, branches 30, 30a, conduit 32 and valve 25 into the return conduit 33 which delivers the expelled fluid into the tank 22. The rate of outflow of fluid from the inner chambers of the holders 2 and 5 is determined by the flow regulating device 31 whose flow restrictor 31a may be adjustable. Since the nuts 2a, 5a are rigidly connected with the respective cylinders 2 and 5, and since such nuts mesh with the feed screws 8 and 9, the feed screws rotate in response to movement of the cylinders 2 and 5 to insure that the two cylinders move apart at the same rate, i.e., that the ideal axis 14 is invariably located midway between the claws 1 and 7 irrespective of the momentary distance between the cylinders. It will be seen that the nuts 2a, 5a and feed screws 8, 9 synchronize the movements of cylinders 2 and 5 to thus insure that each incremental movement of the cylinder 2 in a direction toward or away from the claw 7 is matched by an identical incremental movement of the cylinder 5 toward or away from the claw 1.

When the cylinders 2 and 5 reach their outer end positions (best shown in FIG. 4), the pressure in the conduit 24 rises and the fluid opens the relief valve 34 so that all fluid thereafter delivered by pump 20 can return into the tank 22 by way of the conduit 35.

When the workpiece 55 is thereupon introduced into the space between the claws 1 and 7 (while the cylinders 2 and 5 dwell in spaced-apart positions), the claws are ready to move toward each other and to engage and grip the workpiece in such a way that its axis coincides with the ideal axis 14. One of two transfer mechanisms which can feed workpieces into the space between the claws 1 and 7 is indicated at 36 (see FIG. 1). Such transfer mechanism includes an arm 36a which can pivot at 36b to transfer the workpiece 55 from the position 55A into the space between the claws 1 and 7. The arm 36a can also serve to reset the electromagnetically operated valve 25 so that the latter automatically connects the conduit 24 with the conduit 32 and connects the conduit 26 with the return conduit 33. The pressurized fluid which is delivered by the pump 20 flows through the flow regulating device 31 into the branches 30, 30a and hoses 29, 29a to enter the inner chambers of the cylinders 2, 5. The cylinders move toward each other at a constant rate and through identical increments due to threaded engagement of nuts 2a, 5a with the feed screws 8 and 9 which rotate in automatic response to movement of the cylinders toward each other. The claws 1 and 7 ultimately engage and grip the workpiece 55 with a force which is determined by adjustment of the pressure relief valve 34. This valve opens when the workpiece 55 is properly engaged and centered and allows the fluid thereafter delivered by the pump 20 to flow through the conduit 35 and back into the tank 22.

Figure 1:
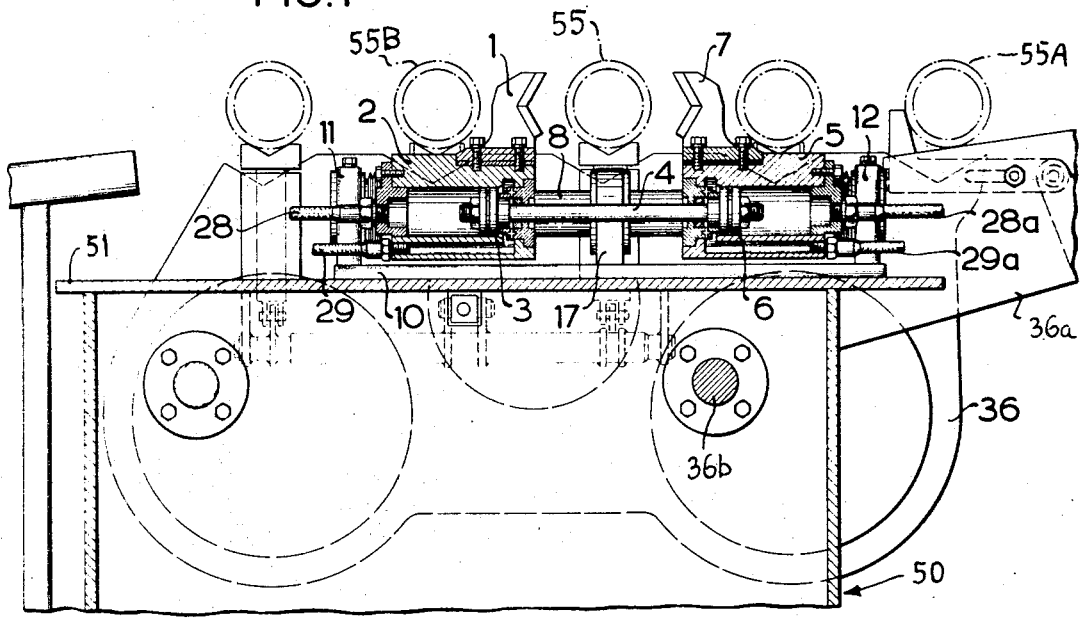
FIG. 1 is a transverse vertical sectional view of an apparatus which embodies the invention, the section being taken in the direction of arrows as seen from the line I—I of FIG. 2.
Figure 3:
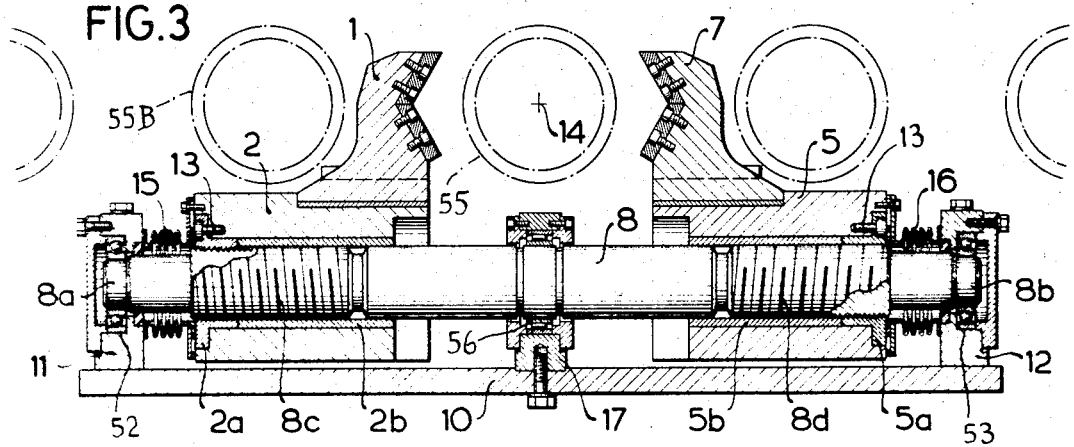
FIG. 3 is an enlarged transverse vertical sectional view as seen in the direction of arrows from the line III—III of FIG. 2.

The clamping action is terminated in response to resetting of the valve 25 to the position shown in FIG. 4; and pressurized fluid then flows into the outer chambers 2c, 5c and causes the cylinders 2 and 5 to move away from each other so that the workpiece 55 can be transferred, for example, to the position 55B shown in FIG. 1 or 3.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In an apparatus for centering and clamping elongated workpieces, such as tubes or rods, a combination comprising a support; a feed screw having spaced outer portions rotatably mounted in said support and spaced first and second inner portions disposed between said outer portions and having oppositely inclined mirror symmetrical threads; first and second cylinders reciprocably supported by said feed screw and having first and second nuts respectively meshing with said first and second inner portions to rotate said feed screw in response to movement of said cylinders toward or away from each other; first and second work-engaging elements respectively provided on said first and second cylinders; and means for moving said cylinders lengthwise of said feed screw, including interconnected pistons reciprocably received in said cylinders and means for effecting controlled admission of a pressurized fluid into and evacuation of fluid from said cylinders.

2. A combination as defined in claim 1, further comprising a second feed screw having spaced outer portions rotatably mounted in said support and spaced first and second inner portions disposed between said last mentioned outer portions and provided with oppositely inclined mirror symmetrical threads, said second feed screw being parallel with said first mentioned feed screw and said first and second cylinders respectively having additional first and second nuts meshing with said first and second inner portions of said second feed screw so that said second feed screw shares all rotary movements of said first mentioned feed screw in response to movement of said cylinders toward or away from each other.

3. A combination as defined in claim 2, wherein said means for moving said cylinders further comprises a piston rod having ends connected with said pistons and being disposed midway between and extending in parallelism with said feed screws.

4. A combination as defined in claim 2, wherein at least said first nuts are angularly adjustable with reference to the respective cylinder and further comprising fastener means for securing said first nuts to the respective cylinder.

5. A combination as defined in claim 2, wherein the axes of said feed screws are disposed in a common substantially horizontal plane.

6. A combination as defined in claim 1, wherein said work-engaging elements are mirror symmetrical claws.

7. A combination as defined in claim 1, wherein said cylinders are double-acting cylinders.

8. A combination as defined in claim 1, wherein said support comprises antifriction bearing means for said outer portions of said feed screw.

9. A combination as defined in claim 1, further comprising bearing means provided on said support and rotatably supporting said feed screw intermediate said inner portions thereof.

10. A combination as defined in claim 1, further comprising means for delivering workpieces between said elements.

* * * * *